United States Patent Office 3,381,970
Patented May 7, 1968

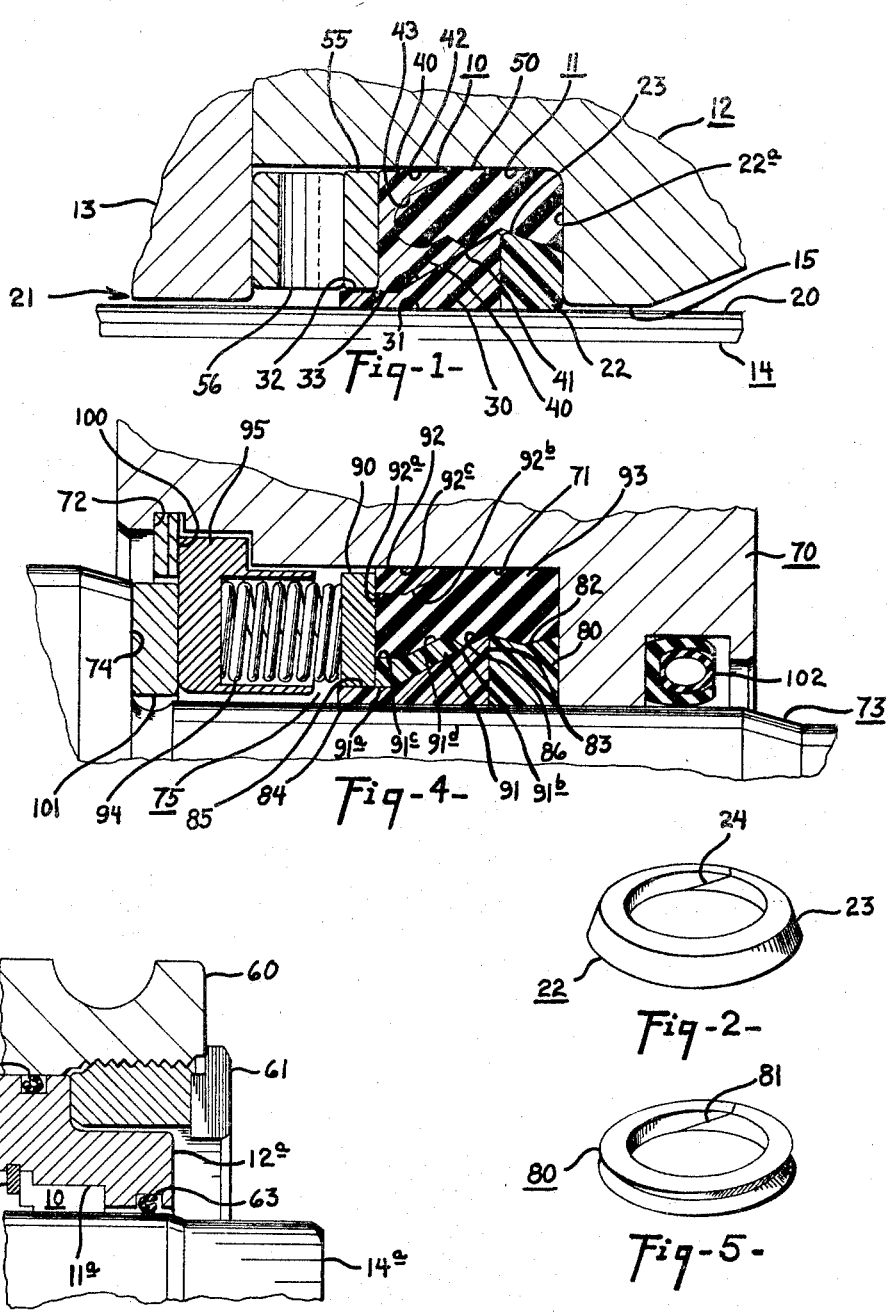

3,381,970
LOW-FRICTION HIGH-PRESSURE SEAL ASSEMBLY
Norman F. Brown, Dallas, Tex., assignor to Otis Engineering Corporation, Dallas, Tex., a corporation of Delaware
Filed Oct. 16, 1964, Ser. No. 404,301
24 Claims. (Cl. 277—119)

This invention relates to seals. More particularly this invention relates to seals for preventing fluid leakage between adjacent surfaces.

It is an object of this invention to provide a new and improved seal which will prevent leakage of a fluid confined under pressure through an opening between adjacent surfaces.

It is a particularly important object of this invention to provide apparatus for effecting a seal between two surfaces wherein the gap between the surfaces may be much wider than normal even though the pressure medium being confined is under substantial pressure.

It is another very important object of this invention to provide apparatus for forming a seal between two surfaces which includes a mass of material capable of plastic flow confined in such a manner that it will exert a pressure in all directions in response and proportion to the pressure of the medium confined by the surfaces being sealed.

It is a still further especially important object of the invention to provide a seal for sealing between two surfaces which utilizes a material capable of plastic flow which material is isolated from the pressure medium confined by the surfaces.

It is also a pertinent object of the invention to provide a seal for preventing the leakage of a pressure medium between at least two surfaces wherein substantial pressures may be retained without extrusion of the primary seal elements employed.

It is another object of the invention to provide a seal assembly for use between at least two surfaces of apparatus which may be placed in an isolated location such as on the ocean bottom and used in such location maintenance free over a substantial period of time.

It is an additional object of this invention to provide a low friction type seal assembly.

It is a still further object of the invention to provide a seal assembly for use under high pressure conditions between surfaces which are movable relative to each other.

It is another object of this invention to provide a seal for use between at least two surfaces which is sufficiently flexible to compensate for wear caused by relative movement of the surfaces.

Additional objects and advantages of the invention will be readily apparent from the reading of the following description of a device constructed in accordance with the invention, and reference to the accompanying drawings thereof, wherein:

FIGURE 1 is a view in cross-section of one embodiment of a seal constructed in accordance with the invention;

FIGURE 2 is a perspective view of a non-extrusion ring seal used in the assembly of FIGURE 1;

FIGURE 3 is a sectional view of a seal according to the invention installed around a shaft extending through a housing;

FIGURE 4 is a view in cross-section of another embodiment of a seal constructed in accordance with the invention; and, FIGURE 5 is a perspective view of a non-extrusion ring seal used in the assembly of FIGURE 4.

Referring now to FIGURE 1, a seal assembly 10 is positioned within a stuffing box 11 formed in the member or seal housing 12. The seal assembly is retained in place within the stuffing box by a cap 13 which is secured to the member 12 by any desired means, such as bolts. The function of the seal assembly is to provide a pressure seal between the member 12 and an adjacent body 14 which may be a rotatable shaft which extends through a passage or bore of the body.

More specifically, the seal assembly serves to effect a pressure-tight seal between the internal surface 15 of the member 12 defining such bore and the surface 20 of the body 14. The seal assembly serves to prevent the escape along and between the two surfaces of the medium exerting a pressure in a direction along the surfaces designated by the arrow 21. It will be evident from the description of the invention that the seal assembly is very effective for sealing a substantial gap between the surfaces 15 and 20.

Continuing with reference to FIGURE 1, a back-up or non-extrusion seal ring 22 is positioned in contact with the surface 20 of the body 14 and the end wall 22a of the stuffing box. The back-up ring is formed of a material having a low coefficient of friction and not readily extrudable through the gap between the surfaces 15 and 20. Preferably the back-up ring is formed of a plastic comprising fluorinated hydrocarbon as sold under the trademark "Teflon," reinforced with glass fiber. The back-up ring may also be formed of a suitable metal. The back-up ring does not function as a seal; its primary purpose is to retain or prevent the extrusion of the other portions of the seal assembly outwardly from the stuffing box through the gap between the surfaces 15 and 20. Since the particular seal assembly illustrated is packaged for easy insertion into an annular space, the external surface 23 of the back-up ring is frusto-conical in shape to aid in holding the ring in place during assembly of the seal elements. Assuming solely for purposes of reference that the direction in which the arrow 21 is pointing is outward the surface 23 is referred to as an outwardly and downwardly sloping frusto-conical surface. Referring to FIGURE 2, the back-up ring is scarf-cut at 24 so that the ring will fit closely around the body 14. The opposing surfaces forming the scarf-cut slide relative to each other to permit the ring to more closely conform to the outer surface of the body 14 as pressure on the surface 23 of the ring increases.

A primary seal ring 30 is positioned in the stuffing box around the body 14 adjacent to and inward from the ring 22. The cylindrical inner surface 31 of the primary seal ring fits against and forms a seal with the surface 20 of the body. The outer surface of the primary seal ring comprises a surface 32 which extends from the inward end of the ring a short distance parallel to the surface 31 and a surface 33 having an outwardly and upwardly sloping frusto-conical shape. The primary seal ring is made of a deformable material having a low coefficient or friction such as "Teflon." The material of which the primary seal ring is formed is more flexible or deformable than the material of the back-up ring. It will be noted that the surface 31 of the primary seal ring is more than twice as wide as the inner surface of the back-up ring since the basic function of the primary seal ring is to effect a seal with the surface 20 and it is desirable that the area of sealing contact between the surfaces 31 and 20 be relatively great. The fundamental purpose of the back-up ring is to prevent the extrusion of the primary seal ring through the gap between the surfaces 15 and 20.

A secondary seal ring 40 is positioned around the primary seal ring. The secondary seal ring has an outwardly and upwardly sloping frusto-conical annular inner surface 41 formed at an angle to mate with the surface 33 of the primary seal ring. The outer surface 42 of the secondary seal ring is cylindrical in shape and contacts the side wall of the stuffing box. Extending inwardly and downwardly from the outward end of the secondary seal ring is an annular groove 43 which allows a pressure medium exerting a pressure within the groove to urge the sides of the seal ring apart. The secondary seal ring may be made of the same material forming the primary seal ring.

A discrete mass or body 50 of a plastically deformable material, hereinafter referred to as the "squeeze ring," is confined within the stuffing box by the back-up ring, the primary seal ring, and the secondary seal ring. The squeeze ring may be formed of any rubber or rubber-like material capable of plastic flow. The squeeze ring is preferably made of a suitable synthetic rubber. It is intended that the squeeze ring retain its integrity as a single mass and yet be readily deformed to transmit pressure in all directions. The squeeze ring preferably is molded from a suitable synthetic rubber into a shape which will fill the cavity and also serve to hold all the components together in a "packaged" unit to facilitate handling and assembly.

A washer 55 is supported at the inward end of the secondary seal ring 40 between the surface of the stuffing box and on the outer surface 32 of the primary seal ring. The washer preferably is constructed of a substantially non-deformable material such as a metal which will uniformly apply pressure over the entire end surface of the secondary seal ring. A spring 56, which may be a wave spring, is positioned around the body 14 in contact with the washer to maintain a static load or positive pressure on the washer at those times when no medium under pressure is confined between the surfaces 15 and 20. The spring bears against the cap 13 so that it is confined between the washer and the cap to bias the washer in an outward direction, or, in other words, along the line of the arrow 21. The force of the washer against the secondary seal ring induces a positive static pressure in the squeeze ring. By positive static pressure is meant a pressure in excess of the atmospheric pressure around the seal in the absence of a fluid under pressure between the surfaces being sealed.

In operation, the seal assembly 10 may be utilized in numerous different applications where the objective is to effect a seal between two surfaces which are subjected to high pressures. The two surfaces may be either movable or non-movable relative to each other. The seal is, however, particularly usable to seal between surfaces which move relative to each other, such as those of a rotatable shaft and of a housing through which the shaft extends. A particular example is a valve in a high pressure fluid system where the shaft for turning the valve extends from the valve housing.

FIGURE 3 represents the installation of the seal 10 around a shaft extending from a housing. Referring particularly to FIGURE 3, the seal assembly 10 is positioned within the stuffing box 11a formed within a seal housing 12a. The seal assembly is held within the seal housing by the lock ring 13a which is identical in function to the cap 13 in the above description of the invention. The seal assembly is held around the rotatable shaft 14a for the purpose of effecting a pressure tight seal around the shaft to prevent leakage from the housing 60 into which the shaft 14a extends. The seal housing 12a is held within the housing 60 by the threaded nut 61. External and internal auxiliary static seals are provided in the seal housing by the seal rings 62 and 63, respectively. Any tendency for the pressure medium within the housing 60 to leak around the shaft will be in a direction from left to right in FIGURE 4, which is identical to the direction represented by arrow 21 in FIGURE 1.

Assuming the seal assembly is installed, as shown in FIGURE 1, it will be recognized that even in the absence of a fluid pressure there will be sealing engagement between the primary seal ring 30 and the shaft 14 due to the load being exerted by the spring 56 on the seal elements forcing surface 31 into engagement with surface 20. The load of the spring is not intended to be great but is, however, sufficient to effect sealing engagement when no pressure medium is confined between the surfaces 15 and 20 so that even when building up the internal pressure there will be no leakage around the seal. Since the spring 56 is not a closed member, the inward face of the washer 55, that is the face on the left side of the washer in FIGURE 1, is subjected to the pressure indicated by the arrow 21. With such pressure urging the washer in an outward direction the load on the washer is transmitted through the secondary seal ring 40 to the squeeze ring. The squeeze ring transmits the pressure in all directions since it acts in the nature of a liquid. The groove 43 in the secondary seal ring is urged apart forcing the outer surface 42 of the seal ring toward or into sealing engagement with the stuffing box wall and the inner surface 41 of the seal ring against the outer surface 33 of the primary seal ring 30. The force being exerted along the surface 33 of the primary seal ring urges the seal ring into sealing contact or engagement with the surface 20 of the shaft 14. The upper portion of the surface 34 is in direct contact with the squeeze ring and thus is likewise urged downwardly so that the primary seal ring at its outward end is also urged toward the surface 20. The squeeze ring also being in contact with the outer frusto-conical surface 23 of the back-up ring causes the back-up ring, due to its scarf cut, to be urged or biased inwardly about the shaft 14 to prevent extrusion of the primary seal ring. The higher the pressure in the direction represented by the arrow 21, the greater the force exerted against the washer 55 by the pressure medium and consequently the greater the stress within the squeeze ring. Such stress transmits proportional pressure to the rings 22 and 30 resulting in closer contact between the rings and the surface 20 to retain the pressure medium behind the seal. The cooperative action between the washer and the primary and secondary seal rings prevents the pressure medium from coming in contact with the squeeze ring. This avoids any narrowing down of the choice of materials for the squeeze ring to those compatible with the fluid handled by the valve and permits a choice based on preferable criteria. The pressure transmitted by the squeeze ring 50 is proportional to the magnitude of the pressure within the pressure medium. Increased pressure in the squeeze ring causes the portions of the secondary seal ring on either side of the groove to be urged apart with more force causing tighter seals between the surface 42 and the side wall of the stuffing box and between the surfaces 41 and 33. Increased pressure on the surface 33 forces the surface 31 into tighter sealing relationship with the surface 20. Since the squeeze ring is completely isolated from the pressure medium, and the "Teflon" seal rings are inert to virtually all fluids to be handled by the valve, an installation such as on the ocean floor will operate substantially maintenance free for long periods of time.

Illustrated in FIGURE 4, is a slightly modified and preferred version of a seal assembly constructed in accordance with the invention. Referring specifically to FIGURE 4, a seal housing 70 is provided with a stuffing box 71 and a lock ring slot 72. The seal housing 70 is secured around the shaft 73 in any convenient manner such, for example, as illustrated in FIGURE 4. The shaft, of course, extends into a housing containing a pressure medium. The shaft, in this particular application, is of reduced diameter on its outward end providing a shoulder 74. The structure and function of most of the elements making up the seal assembly 75 are substantially identical to the elements which form the seal assembly 10 of FIGURE 1. A back-up ring 80 is positioned around the shaft 73 at the outward end of the assembly. As shown in FIGURE 5, the back-up ring is scarf cut at 81 and has an inwardly extending V-shaped or double frusto-conical outer surface 82 to aid in holding the seal ring in position during assembly of the seal element. The back-up ring is symmetrical in form and thus has outward and inward faces of uniform area making it reversible and capable of uniform load distribution. Preferably, the back-up ring is formed of glass reinforced "Teflon." Adjacent to and in contact with the back face of the back-up ring around the shaft is a primary seal ring 83. The primary seal ring is provided with an inner surface 84 which is cylindrical in shape and serves to effect a seal with the shaft 73. The outer surface of the primary seal ring comprises a cylindrical inward portion 85 and an upwardly and outwardly sloping frusto-conical outward portion 86. A spring ring or washer 90 is positioned about the portion 85 with its major cross-sectional dimension extending substantially perpendicular to its longitudinal central axis. An inner secondary seal ring 91 is supported on the surface portions 85 and 86 with an end in contact with the spring ring. The inner secondary seal ring has an inner cylindrical surface 91a and an inner upwardly and outwardly sloping frusto-conical surface 91b. The outer surface of the inner secondary seal ring comprises a cylindrical surface 91c and an upwardly and outwardly sloping frusto-conical surface 91d. Surfaces 91a and 91b mate, respectively, with surfaces 85 and 86 on the primary seal ring. An outer secondary seal ring 92 having a back face in contact with the spring ring, rests against the side wall of the stuffing box 71. The inner surface of the outer secondary seal ring comprises a cylindrical surface 92a and an upwardly and outwardly sloping frusto-conical surface 92b. The outer surface 92a of the outer secondary seal ring is cylindrical to conform to the side wall of the stuffing box. The washer 90 and the seal ring 91 and 92 serve the function of and may be more easily molded than the seal ring 40 of FIGURE 1. The seals 83, 91 and 92 are each preferably formed of a low friction, moderately flexible material such as "Teflon." A discrete mass of material 93, the squeeze ring, capable of plastic flow, is confined by the combination of the inner surfaces of the stuffing box, the seal rings 80, 83, 91 and 92 together with the spring washer 90. A plurality of coil springs 94 are positioned in contact with the spring ring supported within a spring cage 95 which encircles the shaft to hold the springs radially around the shaft to urge the spring ring in an outward direction. A lock ring 100 retains the spring cage in position. A thrust washer 101 is located between the shoulder 74 and the spring cage. A seal ring 102 forms a seal between the shaft and the seal housing 70 to exclude a liquid such as salt water if the seal of the invention is employed in an underwater location.

The seal assembly illustrated in FIGURE 4 functions in the same manner as the seal assembly illustrated in FIGURE 1, the operation which is described hereinabove. In brief the squeeze ring is stressed by the pressure from the spring ring which is biased in an outwardly direction by the springs 94 and further urged outwardly by the pressure between the shaft and the seal housing. As the spring ring moves outwardly the inner and outer secondary seal rings are also moved outwardly. The surface 91b slides upwardly and outwardly along the surface 86. The outward force imparted by the springs and the shut in pressure is transmitted differentially to the outer and inner secondary seal rings and to the squeeze ring. The stress increase is proportional to the pressure and, in turn, so is the efficacy with which the outer secondary seal ring seals against the housing, the primary seal ring seals against the shaft, the spring ring seals against the inner and outer secondary seal rings, and finally the efficacy with which the back-up ring, pressed inwardly by the squeeze ring, maintains zero clearance with the shaft and prevents extrusion of the primary seal ring. The seals formed between the inner secondary seal ring, the primary seal ring, and the spring ring along with the seal formed between the outer secondary seal ring and the stuffing box and spring ring prevent the pressure medium from reaching the squeeze ring. The back-up ring forms a seal with the end wall of the stuffing box and the end surface of the primary seal ring sufficient to retain the squeeze ring.

The various plastic and rubber elements of the seal assembly of FIGURE 4 are readily molded to the shapes shown. The squeeze ring is formed with a cross-section substantially as illustrated. If, when the assembly is serviced for some reason, the back-up ring is worn on a corner, it may easily be reversed due to its symmetrical form.

It will be evident that in the instance of each embodiment of the invention illustrated the forces of the secondary seal rings and the squeeze ring against the sloping outer surface of the primary seal ring result in a downward and outward force which further confines the seal element in the stuffing box including urging the back-up ring against the end wall of the stuffing box.

It will now be apparent that a new and improved form of pressure seal has been described and illustrated which includes a plastically deformable material isolated from the pressure medium and urging a back-up ring into engagement between at least two surfaces so that all clearance may be closed off between the surfaces to prevent extrusion of the elements of the seal. It will be further apparent that a form of a seal has been provided which, due to its novel mechanism for transmitting sealing pressures and protecting the pressure transmitting medium, may be installed in a remote location and subjected to a corrosive environment such as in an ocean bottom installation. It will be further apparent that a seal has been provided in which the sealing engagement between the elements of the seal and the surfaces being sealed is improved in proportion to the pressure being exerted upon the seal. It will also be apparent that the combination of elements comprising the seal of the invention provides a low friction form of seal which may be utilized between surfaces movable relative to each other.

Seals normally employed between surfaces under 10,000 p.s.i. require a gap between the surfaces approaching zero width to prevent extrusion of the seal element. A seal constructed in accordance with the invention will effectively bridge a gap of about 0.006" to 0.010" around a shaft having a diameter of 1.5" under a pressure of 10,000 p.s.i.

With respect to the embodiment of the invention illustrated in FIGURE 4 it will be evident to those skilled in the art that the inner and outer secondary seal rings 91 and 92 may be constructed in the form of a single secondary seal ring such as the seal ring 40 illustrated in FIGURE 1.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A pressure seal for effecting a sealed relationship between at least two surfaces comprising in combination: a seal housing a stuffing box formed therein; a cylindrical member extending through said stuffing box; at least one of said housing and said cylindrical member being movable with respect to the other; a back-up ring positioned in said stuffing box for contacting a first surface in said stuffing box and an adjacent surface of said cylindrical member; a primary seal ring supported for contact with said adjacent surface inwardly of said back-up ring toward a source of pressure between said housing and said cylindrical member; secondary seal ring means supported around and engageable with said primary seal ring and a second surface of said stuffing box; means biasing said secondary seal ring means for movement with respect to said primary seal ring and said stuffing box away from said pressure source; wedge means on said primary seal ring and said secondary seal ring means engageable upon such movement of said secondary seal ring means with respect to said primary seal ring to urge said primary seal ring into sealing engagement with said cylindrical member and to urge said secondary sead ring means into sealing engagement with said second surface of said stuffing box and to urge said primary seal ring and said secondary seal ring means into sealing engagement with each other; and a body of material capable of plastic deformation confined by said housing, said back-up ring, said primary seal ring and said secondary seal ring means and acting on said primary seal ring and said secondary seal ring means to bias the same toward sealing position upon compression and deformation of said body of material.

2. A seal of the character set forth in claim 1 including: means on said primary seal ring separating said secondary seal ring means for contact with said cylindrical member.

3. A seal of the character set forth in claim 1, wherein the movement of said secondary seal ring means with respect to said primary seal ring along said wedge means deforms said mass of deformable material to bias said back-up ring into sealing engagement between said first surface of said stuffing box and said cylindrical member; and means is positioned in contact with said secondary seal ring means biasing said secondary seal ring means toward said mass of material capable of plastic deformation to effect initial deformation thereof.

4. A seal of the character set forth in claim 2 wherein: said primary seal ring, said secondary seal ring means and said back-up ring isolate said mass of material capable of plastic deformation from exposure to fluid pressure from said source of fluid pressure between said housing and said cylindrical member, and resilient bias means is disposed in said stuffing box to engage said secondary seal ring means to move said secondary seal ring means with respect to said primary seal ring toward sealing position.

5. A seal of the character set forth in claim 1, wherein said secondary seal ring means comprises an inner secondary seal ring member engaging said primary seal ring and an outer secondary seal ring member spaced from said inner secondary seal ring member and coaxial with said inner secondary seal ring member and engaging said second surface of said stuffing box; and pressure ring means engaging the inward ends of said inner and outer secondary seal ring members to close the space therebetween and confine the mass of deformable material therebetween; and resilient means biasing said pressure ring means into sealing engagement with said inward ends of said inner and outer secondary seal ring members.

6. A seal assembly for effecting a sealing relationship across a gap between at least two surfaces on adjacent members comprising in combination: a seal housing having a stuffing box formed therein, said stuffing box having a side and an end wall, a first of said surfaces being associated with said seal housing; a back-up ring provided with a scarf cut positioned within said stuffing box, the outward end of said back-up ring being in contact with the end wall of said stuffing box and the inner surface of said back-up ring being positioned to contact the second of said surfaces; a primary seal ring positioned within said stuffing box, the outward end of said primary seal ring being in contact with the inward end of said back-up ring and the inner surface of said primary seal ring being positioned to contact the second of said surfaces; a secondary seal ring positioned around said primary seal ring, the inner surface of said secondary seal ring resting on the outer surface of said primary seal ring, the outer surface of said secondary seal ring being in contact with the side wall of said stuffing box, said secondary seal ring having an outwardly facing annular groove formed therein whereby the inner and outer surfaces of said secondary seal ring may be moved toward and away from each other; a mass of material capable of plastic deformation confined within said stuffing box by said back-up ring, said primary seal ring and said secondary seal ring, whereby said mass of material is isolated from a pressure medium between the first and second surfaces; and means in contact with the inward end of said secondary seal ring biasing said secondary seal ring in an outward direction, said means being responsive to the pressure of said pressure medium between said surfaces.

7. A seal assembly according to claim 6 wherein the biasing means includes a substantially rigid washer in contact with the inward end of said secondary seal ring, and means for urging said washer toward said secondary seal ring.

8. An apparatus in accordance with claim 7 wherein the means for urging the washer toward the secondary seal ring includes a spring.

9. A seal assembly for establishing a sealed relationship between a housing and a movable shaft comprising in combination: a seal housing having a stuffing box formed therein, said stuffing box opening through the inward end of said housing and toward said shaft and having a side wall and an end wall; a non-extrusion ring supported within the said stuffing box, the outward end of said non-extrusion ring being in contact with the end wall of said stuffing box and the inner surface of said non-extrusion ring being positioned to contact said shaft, said non-extrusion ring being provided with a scarf cut whereby increased pressure around said ring will cause said ring to wrap more tightly around said shaft; a primary seal ring positioned in said stuffing box, the outer end of said primary seal ring being in contact with the inward end of said non-extrusion ring and the inner surface of said primary seal ring being positioned to effect sealing relationship with said shaft; a secondary seal ring positioned around said primary seal ring, the inner surface of said secondary seal ring being in contact with the outer surface of said primary seal ring and the outer surface of said secondary seal ring being in contact with the side wall of said stuffing box, said secondary seal ring having an annular groove opening into the outer end of said secondary seal ring whereby the portions of said secondary seal ring bounding said groove will deflect toward and away from each other; a mass of material capable of plastic deformation confined within said stuffing box by said non-extrusion ring, said primary seal ring and said secondary seal ring, said mass of material being isolated from a pressure medium between said shaft and said housing; a washer positioned around said shaft in contact with the inward end of said secondary seal ring; and spring means positioned in contact with the inward face of said washer to bias said washer toward said secondary seal ring, said spring means being supported in contact with said washer such that the pressure of said pressure medium is exposed to the inward face of said washer to urge said washer toward said secondary seal ring with a force proportional to the pressure level within said pressure medium.

10. A seal assembly for effecting a seal with a shaft extending through a housing comprising in combination: a seal housing around said shaft, said seal housing having a stuffing box opening toward said shaft and having a side wall and an end wall; a back-up ring positioned within said stuffing box around and in position to contact said shaft, the outward end of said back-up ring being in contact with the end wall of said stuffing box, said back-up ring having a downwardly and outwardly sloping frusto-conical outer surface; a primary seal ring positioned around said shaft, the outward end of said primary seal ring being in contact with the inward end of said back-up ring, the major portion of the outer surface of said primary seal ring being an outwardly and upwardly sloping frusto-conical surface; a secondary seal ring positioned in said stuffing box around said primary seal ring, said secondary seal ring having an inner surface which is an upwardly and outwardly sloping frusto-conical surface in contact with the outer surface of said primary seal ring, said secondary seal ring having an outer cylindrical surface in contact with the side wall of said stuffing box, said secondary seal ring having an annular groove opening into said secondary seal ring from the outer end thereof whereby the outer and inner surfaces of said secondary seal ring may be urged toward and deflected from each other; a mass of rubber-like material confined within said stuffing box and said back-up ring, said primary seal ring, and said secondary seal ring; a substantially rigid washer positioned around the outer surface of said primary seal ring with the outer surface of said washer being adjacent the side wall of said stuffing box, the outward end surface of said washer being in contact with the inward end surface of said secondary seal ring; and spring means engageable with the inward face of said washer to urge said washer in an outward direction biasing said secondary seal ring toward said rubber-like material, said spring means allowing the pressure medium between said housing and said shaft to be exposed to the inward face of said washer to urge said washer toward said rubber-like material with a force proportional to the pressure of said pressure medium.

11. A seal assembly for effecting a sealing relationship between a housing and a shaft which comprises in combination: a seal housing having a stuffing box formed therein opening toward the inward end of said shaft and having an end wall and a side wall; a back-up ring supported within said stuffing box around said shaft, the outer end of said back-up ring being in contact with the end wall of the said stuffing box, the outer surface of said back-up ring having double inwardly sloping frusto-conical surfaces forming an inwardly extending V-shaped groove, said back-up ring being scarf cut whereby said back-up ring will more tightly encircle said shaft with increased pressure being applied to the outer surface of said back-up ring; a primary seal ring positioned around said shaft within said stuffing box with the outer end of said primary seal ring being in contact with the inward end of said back-up ring, a substantial portion of the outer surface of said primary seal ring having an outwardly and upwardly sloping frusto-conical shape; an inner secondary seal ring positioned around and in contact with the outer surface of said primary seal ring; an outer secondary seal ring positioned within said stuffing box in contact with the side wall of said stuffing box; a spring ring around said primary seal ring within said stuffing box, the outward face of said spring ring being in contact with the inward ends of said inner and said outer secondary seal rings; a discrete mass of rubber-like material capable of plastic deformation positioned within said stuffing box and confined therein by the walls of said stuffing box and the inner surfaces of said back-up ring, said primary seal ring, said secondary seal rings, and the outward end of said spring ring whereby said material is isolated from a pressure medium between said housing and said shaft; a plurality of springs supported around and in contact with the back face of said spring ring to bias said spring ring outwardly toward said secondary seal rings and said rubber-like material; a spring cage within said stuffing box around said shaft supporting said springs; and a locking ring engaged within said stuffing box with said housing to retain said spring cage in position.

12. A seal assembly for effecting a sealing relationship between a housing and a shaft through said housing which comprises in combination: a seal housing having formed therein a stuffing box having an end wall and a side wall; a back-up ring supported within said stuffing box around said shaft, the outward end of said back-up ring being in contact with the end wall of said stuffing box, said back-up ring being scarf cut whereby said ring will more tightly encircle said shaft with increased pressure applied to the outer surfaces of said ring; a primary seal ring positioned around said shaft within said stuffing box, the outward end of said primary seal ring being in contact with the inward end of said back-up ring; an inner secondary seal ring positioned around and in contact with the outer surface of said primary seal ring; an outer secondary seal ring positioned within said stuffing box in contact with the side wall of said stuffing box; a ring member around said shaft positioned in contact with the inward ends of said secondary seal rings; a discrete mass of rubber-like material capable of plastic deformation confined within said stuffing box by said back-up ring, said primary seal ring, and secondary seal rings and said ring member; and spring means associated with said ring member biasing said ring member toward said rubber-like material.

13. A seal assembly in accordance with claim 12 wherein: said primary and said secondary seal rings comprise a material more deformable than said back-up ring; and said discrete mass of material is more deformable than said primary and said secondary seal rings.

14. A seal assembly in accordance with claim 11 wherein: said inner secondary seal ring has an inner surface the major portion of which is a frusto-conical surface sloping upwardly and outwardly and an outer surface the major portion of which is a frusto-conical surface sloping upwardly and outwardly; and said outer secondary seal ring has an inner surface a major portion of which is an upwardly and outwardly sloping frusto-conical surface and an outer surface which is cylindrical in shape.

15. Apparatus in accordance with claim 14 wherein: said back-up ring comprises a glass reinforced plastic material; said primary and secondary seal rings comprise a plastic material more deformable than the material comprising said back-up ring; and said discrete mass of material comprises a synthetic rubber.

16. A seal assembly in accordance with claim 15 wherein said plastic is a fluorinated hydrocarbon.

17. A seal assembly for sealing between two adjacent members, at least one movable with respect to the other, and exposed to fluid pressure therebetween, said seal assembly including: first seal means engageable with a first one of said adjacent members; second seal means engageable with the second of said adjacent members and with said first seal means, whereby said first and second seal means seal between said adjacent members; and a body of deformable material confined between said first and second seal means and said second member and isolated from said fluid pressure between said adjacent members, means for biasing said second seal means and said first seal means into initial sealing engagement with said first and said second adjacent member and for deforming said deformable mass to force said seal members positively into such initial sealing engagement, said fluid pressure between said members acting an said first and second seal means to deform said deformable mass to further force said first and second seal means into sealing engagement with each other and said first and said second adjacent members.

18. A seal assembly of the character set forth in claim 17, including: a retaining member disposed between said deformable mass and said second of said adjacent members and between said first seal means and said first of said adjacent members and movable by deformation of said deformable mass toward engagement with said second of said adjacent members to prevent displacement of said deformable mass and said first seal means between said adjacent members.

19. A seal for sealing between a pair of adjacent members, one having a recess formed therein for receiving said seal, said seal including: primary seal means disposed in said recess and engaging said one of said members; secondary seal means disposed in said recess and engaging said primary seal means and the other of said members; said primary seal means being movable into sealing engagement with said first member and said secondary seal means, said secondary seal means being movable into sealing engagement with said other member and said primary seal means; and a body of plastically deformable material confined in said recess between said primary and secondary seal means and said one member, means biasing said secondary seal means for movement with respect to said primary seal means toward said deformable material to deform said primary seal means and said secondary seal means into sealing engagement with each other and with said first member and said second member respectively, said primary seal means and said secondary seal means confining said deformable material from exposure to fluid pressure acting on said seal means in the space between said members.

20. A seal for sealing between a pair of adjacent members comprising: a primary seal means supported for engagement with one of said members; a discreet mass of deformable material engageable with said primary seal means and with the second of said adjacent members and secondary seal means engageable with said second member and said primary seal means for confining said mass of deformable material between said secondary seal means, said primary seal means and said second member, and movable to deform said deformable material to bias said primary seal means into sealing engagement with said first member and to bias said secondary seal means into sealing engagement with said second member and said primary seal means, said secondary seal means and said first seal means coacting with said first and second members to isolate said deformable material from contact with said pressure medium acting on said primary and secondary seal means between said adjacent members.

21. A seal of the character set forth in claim 20, wherein said primary seal means is provided with means separating said secondary seal means for engagement with said one of said adjacent members.

22. A seal for sealing between a pair of adjacent members, at least one of which is movable with respect to the other, and exposed to fluid pressure therebetween, said seal including; an annular primary seal means supported for engagement with one of said members; an annular discreet mass of the formable material engageable with said primary seal means and with the second of said adjacent members; and annular secondary seal means engageable with said second member and said primary seal means for confining said mass of deformable member between said secondary seal means, said primary seal means and said second seal member; and movable to deform said deformable materials by said primary seal means into sealing engagement with said first member and to bias said secondary seal means into sealing engagement with said second member and said primary seal means; said second seal means and said first seal means coacting with said first and second seal members to isolate said deformable material for contact with said pressure means acting on said primary and secondary seal means between said adjacent members.

23. A seal of the character set forth in claim 22, wherein said secondary seal means includes a pair of spaced coaxial annular portions over and underlying a portion of said mass of deformable material; and a third annular portion contacting both said annular coaxial portion and closing the space therebetween.

24. A seal of the character set forth in claim 22, including: an annular retaining member disposed between said mass of deformable material and said first of said adjacent members and between said primary seal means and said first of said adjacent members and movable by deformation of said deformable material toward engagement with said second of said adjacent members to prevent displacement of deformable material and said primary seal means between said adjacent members.

References Cited

UNITED STATES PATENTS

| | | | |
|---|---|---|---|
| 718,008 | 12/1902 | Lochridge et al. | 277—118 |
| 2,765,204 | 10/1956 | Josephson | 277—188 |
| 2,807,484 | 9/1957 | Stewart | 277—117 |
| 2,963,304 | 12/1960 | Comlossy et al. | 277—188 X |
| 3,172,670 | 3/1965 | Pras | 277—188 X |
| 3,218,087 | 11/1965 | Hallesy | 277—165 X |

FOREIGN PATENTS

| | | |
|---|---|---|
| 446,869 | 5/1936 | Great Britain. |
| 710,374 | 6/1954 | Great Britain. |
| 1,193,987 | 5/1959 | France. |

LAVERNE D. GEIGER, *Primary Examiner.*

J. S. MEDNICK, *Assistant Examiner.*